(12) United States Patent
Lee

(10) Patent No.: US 8,525,811 B2
(45) Date of Patent: Sep. 3, 2013

(54) CAPACITIVE TOUCH PANEL

(75) Inventor: Hsiang-Yu Lee, Taipei Hsien (TW)

(73) Assignee: SuperC-Touch Corporation, New Taipei (TW)

( * ) Notice: Subject to any disclaimer, the term of this patent is extended or adjusted under 35 U.S.C. 154(b) by 848 days.

(21) Appl. No.: 12/701,611

(22) Filed: Feb. 8, 2010

(65) Prior Publication Data

US 2011/0163993 A1 Jul. 7, 2011

(30) Foreign Application Priority Data

Jan. 6, 2010 (TW) ................. 99100129 A (51) Int. Cl.
G06F 3/045 (2006.01)
(52) U.S. Cl.
USPC ........................................................ 345/174
(58) Field of Classification Search
USPC ........................................ 345/156, 173, 174
See application file for complete search history.

(56) References Cited

U.S. PATENT DOCUMENTS

| | | | | |
|---|---|---|---|---|
| 5,543,588 A * | 8/1996 | Bisset et al. | ............... | 178/18.06 |
| 7,868,877 B2 * | 1/2011 | Pietri et al. | ..................... | 345/174 |
| 2008/0048997 A1 * | 2/2008 | Gillespie et al. | .............. | 345/174 |
| 2009/0102802 A1 * | 4/2009 | Pietri et al. | ..................... | 345/173 |
| 2009/0167718 A1 * | 7/2009 | Lee et al. | ....................... | 345/174 |
| 2009/0244014 A1 * | 10/2009 | Hotelling et al. | ............. | 345/173 |
| 2010/0097340 A1 * | 4/2010 | Mizuhashi et al. | ........... | 345/173 |
| 2010/0171723 A1 * | 7/2010 | Kobayashi et al. | ........... | 345/174 |
| 2011/0163992 A1 * | 7/2011 | Cordeiro et al. | ............. | 345/174 |

* cited by examiner

Primary Examiner — William Boddie
Assistant Examiner — Jeffrey A Parker
(74) Attorney, Agent, or Firm — Muncy, Geissler, Olds & Lowe, PLLC (57) ABSTRACT

A capacitive touch panel consists of a touch panel having a plural conductive wires, a multiplex selector electrically connected to the plural conductive wires of the touch panel, a first switch electrically connected to the multiplex selector, a first resistor having a first resistor value, a second switch electrically connected to the resistor and the first switch, a capacitor having a capacitance value, the capacitor electrically connected to the first switch and the second switch, a third switch electrically connected to the capacitor, an Analogue to Digital converter, a fourth switch electrically connected to the Analogue to Digital converter and the third switch, and an integrating circuit electrically connected to the second switch and the fourth switch.

18 Claims, 6 Drawing Sheets

CAPACITIVE TOUCH PANEL

FIELD OF THE INVENTION

The invention relates to touch panel devices, and in particular to a capacitive touch panel device.

BACKGROUND OF THE INVENTION

There are many kinds of touch panel devices (in the following, it is called as touch panel in short), which are resistive, capacitive, optical touch panels, etc. A resistive touch panel is formed by overlapping an upper and a lower conductive layer. The pressure applied to the touch panel will cause the upper layer electrode and the lower layer electrode to conduct. A controller calculates the positions of touch points by detecting the voltage variations of the touch panel. As to the capacitive touch panel, a capacitive symptom will occur between the electrodes built in the panel and the static electricity carried by human body. Using time delays caused by charging and discharging a capacitor, the coordinates of the touch points can be obtained. Optical touch panels adopt light source obstruction principle. The composition of light sources and receivers are formed as a matrix on a surface of the optical touch panel. The position of the touch point can be detected once the light source was obstructed.

So far, up to year 2010, the resistive touch panels occupied a very big market share. The capacitive touch panels are not so popular because there are so many problems waiting to be solved. Mainly the capacitive touch panel utilizes the capacitive interaction of finger touch to judge the position by detecting the capacitive variations. But the size of touching area, the temperature, the humidity and the pressure will influence the capacitive volume. The noise of signals induced by finger touch causes the treatment of signals to become difficult. This causes that the costs go higher and become less popular. Therefore, to make the capacitive touch panel more popular, it is necessary to find ways to solve these existing problems.

SUMMARY OF THE INVENTION

One purpose of the present invention is to design a capacitive touch panel device by applying the law of conservation of energy to avoid the problems caused by the capacitance variation due to the changes of the contacting area in order to increase the precision of the position detecting and the good rate of production.

To achieve the above purpose, the present invention provides a capacitive touch panel device, comprising the following elements of:
A touch panel having plural conductive wires,
A multiplex selector electrically connected to the plural conductive wires of the touch panel,
A first switch electrically connected to the above multiplex selector,
A first resistor having a first resistance value,
A second switch electrically connected to the first resistor and the first switch,
A capacitor having a capacitor value, this capacitor electrically connected to the first switch and the second switch,
A third switch electrically connected to the capacitor,
An Analogue to Digital converter,
A fourth switch electrically connected to the Analogue to Digital converter and the third switch and
An integrating circuit electrically connected to the second switch and the fourth switch.

Among these, the third switch is switched to connect a DC power source. The second switch is switched to the capacitor to charge the capacitor. There is a conductive resistor existed in the middle of the conductive wire between the touching point and the multiplex selector. This resistor has a second resistor value. The third switch is switched to the fourth switch so that the Analogue to Digital converter is electrically connected to the capacitor to read a voltage value after the capacitor is charged. This capacitor has a first voltage value. The first switch is switched to such capacitor so to make the capacitor charge the floating capacitor of the touch point. The integrating circuit records the absolute value of a current flowing through the resistor. The first switch is switched to the second switch so to discharge the floating capacitor. The integrating circuit records the absolute value of a current flowing through such resistor. The first switch and second switch are switched to the capacitor so to make the capacitor charge the floating capacitor applied to the touch point. The integrating circuit records an absolute value of a current flowing through the first resistor. The first switch is switched to the second switch again so to discharge the floating capacitor and the integrating circuit records the absolute value of a current flowing through the first resistor. After repeating the procedure of charge and discharge many times, the integrating circuit stops to record the absolute value of a current flowing through the first resistor. The second switch is switched to the capacitor and the Analogue to Digital converter reads a second voltage value of the capacitor. The fourth switch is switched to the integrating circuit so that the Analogue to Digital converter reads a value of current from the integrating circuit as a value of current. The Analogue to Digital converter transmits the first voltage value, the second voltage value and the value of current read above to a device driver in order to calculate the second resistor value of the conductive resistor. The value of the second resistor is calculated as:

$$R2 = \frac{1}{2}C\left(\frac{V1^2 - V2^2}{I^2}\right) - R1,$$

Wherein C is the value of the capacitor, V1 is the value of the first voltage, V2 is the value of the second voltage, I is the value of the current and R1 is the value of the first resistor. The value of the second resistor converted into a coordinate value of a touch point by the device driver. And if the value of I is smaller than a preset value, it means no finger touch on the touch panel.

Furthermore, the present invention contains an inductor electrically connected to the first switch and the second switch. The multiplex selector scans the conductive wires of the touch panel sequentially.

The other purpose of the present invention is to design a capacitive touch panel device by applying the law of conservation of energy to avoid the problems caused by the capacitance variation due to the changes of the contacting area in order to increase the precision of the position detecting and the good rate of production.

To achieve the above purpose, the capacitive touch panel device supplied by the present invention comprising:
A touch panel containing a conductive plane and plural detecting points;
A multiplex selector electrically connected to the plural detecting points of the touch panel;
A first switch electrically connected to the multiplex selector
A first resistor having a first resistor value;

A second switch electrically connected to the first resistor and the first switch;

A capacitor having a capacitor value, this capacitor electrically connected to the first switch and the second switch;

A third switch electrically connected to the capacitor;

An Analogue to Digital converter;

A fourth switch electrically connected to the Analogue to Digital converter, the third switch and an integrating circuit electrically connected to the second switch and the fourth switch.

Among these, the third switch is switched to connect a DC power source. The second switch is switched to the capacitor to charge the capacitor. Among the touching point and the conductive plane of the plural detecting points, there is a conductive resistor existed individually between each detecting point and the touching point. These conductive resistors have an individual resistance value. The third switch is switched to the fourth switch so to make the Analogue to Digital converter electrically connect to the capacitor to read a voltage value after the capacitor is charged. This capacitor has the first voltage value. The first switch is switched to this capacitor so to make this capacitor charge the floating capacitor of the touch point on the touch panel. The integrating circuit records an absolute value of a current flowing through the first resistor. The first switch is switched to the second switch so to discharge the floating capacitor. The integrating circuit records the absolute value of a current flowing through the first resistor. The first switch and the second switch are switched to the capacitor so to make the capacitor charge the floating capacitor of the touch point again. The integrating circuit records an absolute value of a current flowing through the first resistor. The first switch is switched to the second switch again so to discharge the floating capacitor and the integrating circuit records the absolute value of a current flowing through the first resistor. After repeating the procedure of charge and discharge many times, the integrating circuit stops to record the absolute value of a current flowing through the first resistor. The second switch is switched to this capacitor and the Analogue to Digital converter reads a second voltage value of this capacitor. The fourth switch is switched to the integrating circuit so to make the Analogue to Digital converter read a total value of current of the equivalent current of the first resistor. It has a value of current as I. The Analogue to Digital converter transmits the first voltage value, the second voltage value, and such value of current I to a device driver to calculate the resistor value of such conductive resistor. The value of such resistor is calculated as:

$$R2 = \frac{1}{2}C\left(\frac{V1^2 - V2^2}{I^2}\right) - R1,$$

Wherein C is the value of the capacitor, V1 is the value of the first voltage, V2 is the value of the second voltage, I is the value of the current and R1 is the value of the first resistor value.

The value of the second resistor converted into a coordinate value of a touch point by the device driver. And if the value of I is smaller than a preset value, it means no finger touch on the touch panel.

The various objects and the advantages of the present invention will more easily be understood by reading the following detailed descriptions and drawings appended.

DETAILED DESCRIPTION OF THE INVENTION

For understanding the present invention further, detailed descriptions are provided in the following pages.

However, the examples of application described as following are only for the convenience of explaining some application examples of the present invention. The scope of patent claimed by the present invention should be based on the content claimed by the present invention not limited to these application examples.

Figure 1:
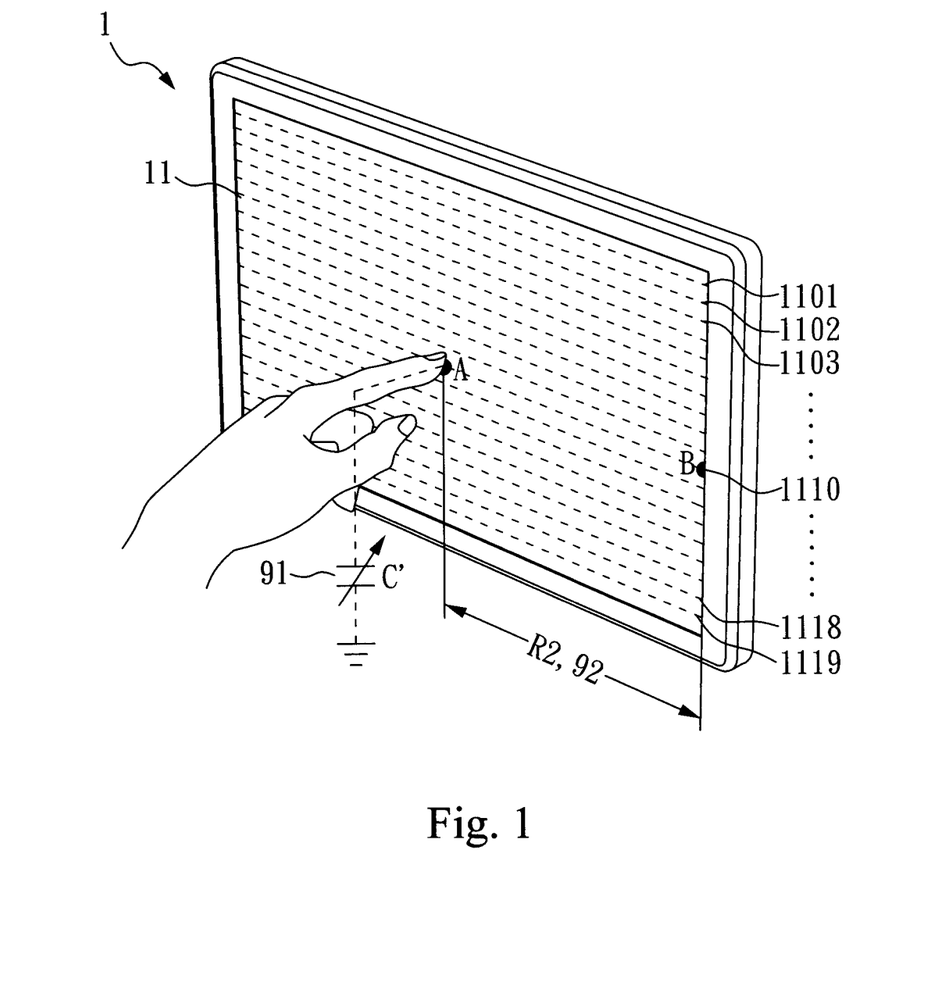
FIG. 1 is a schematic view of the preferred embodiment of the present invention.
Figure 2:
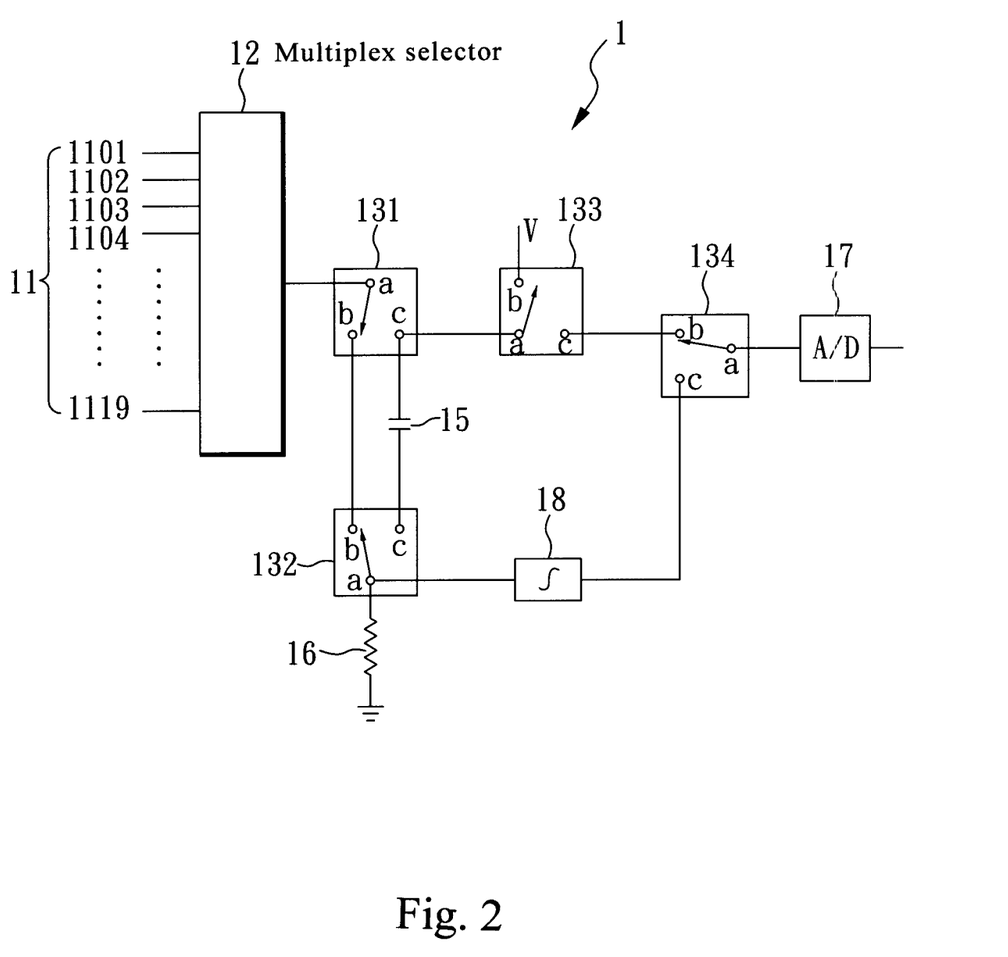
FIG. 2 is a first system structure of the preferred embodiment of the present invention.

With reference to FIGS. 1 and 2, FIG. 1 is a schematic view of the preferred embodiment of the present invention. FIG. 2 is a first system structure of the preferred embodiment of the present invention. As shown in the drawings, the capacitive touch panel device 1 of the present invention includes a touch panel 11, a multiplex selector 12, a first switch 131, a second switch 132, a third switch 133, a fourth switch 134, a capacitor 15, a resistor 16, an Analogue to Digital converter 17 and an integrating circuit 18.

The touch panel 11 contains plural parallel conductive wires. For the convenience of explaining the way of operation of the present invention, the touch panel 11 of this embodiment contains 19 conductive wires as 1101~1119. The multiplex selector 12 is electrically connected to the conductive wires 1101~1119.

The first end "a" of the first switch 131 is electrically connected to the multiplex selector 12, the second end "b" of the first switch 131 is connected to the second end "b" of the second switch 132 and the third end "c" of the first switch 131 is connected to one end of the capacitor 15.

The first end "a" of the second switch 132 is electrically connected to a resistor 16 and the integrating circuit 18. The second end "b" of the second switch 132 is connected to the second end "b" of the first switch 131 and the third end "c" of the second switch 132 is connected to the other end of the capacitor 15.

The first end "a" of the third switch 133 is electrically connected to the capacitor 15 and the third end "c" of the first switch 131, the second end "b" of the third switch 133 is connected to a DC power source V, and a third end "c" of the third switch 133 is connected to the second end "b" of the fourth switch 134.

The first end "a" of the fourth switch 134 is connected to the Analogue to Digital converter 17, the second end "b" of the fourth switch 134 is connected to the third end "c" of the third switch 133, and a third end "c" of the fourth switch 134 is connected to the integrating circuit 18.

Among these, the resistance value of the resistor 16 is R1. The capacitor value of the capacitor 15 is C.

Figure 3:
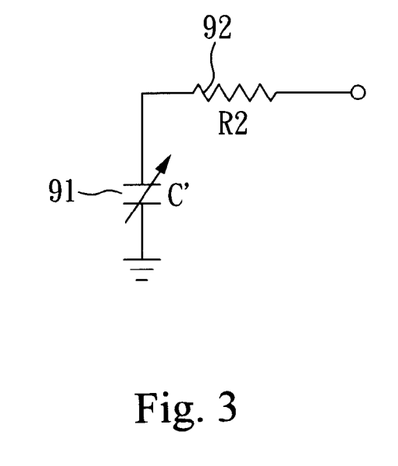
FIG. 3 is a first equivalent circuit drawing of the present invention.

When the operator touches the contacting point A of the touch panel 11, the operator generates a floating capacitor 91 with a capacitor value C'. The value of the floating capacitor 91 varied with the size of area of the contacting point A. Furthermore, from the contacting point to the end point B, there is a resistor value R2 of the conductive resistor 92. The equivalence circuit is shown as FIG. 3.

Figure 4:
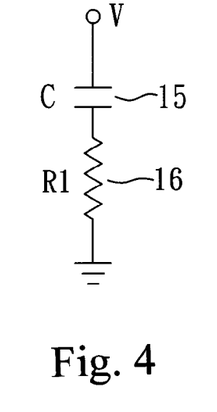
FIG. 4 is a second equivalent circuit drawing of the present invention.

The multiplex selector 12 will scan the conductive wires 1101~1119 of the touch panel 11 from end to end sequentially. For example, when it scans the conductive wire 1110, the first end "a" of the third switch 133 will be switched its second end "b" to connect to the DC power source V and the capacitor 15. The first end "a" of the second switch 132 will be switched to its third end "c" to connect the capacitor 15 and the resistor 16. Then the DC power source V will charge the capacitor 15. The equivalent circuit is shown as FIG. 4. After completion of the charging cycle, the first end "a" of the third switch 133 is switched to its third end "c". The first end "a" of the fourth switch 134 is switched to its second end "b" so that the Analogue to Digital converter 17 is electrically connected to the capacitor 15 and read a voltage value V1 after charging and set the integrating circuit 18 to zero.

Figure 5:
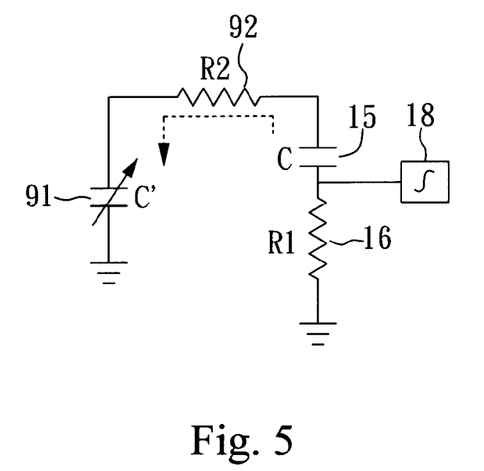
FIG. 5 is a third equivalent circuit drawing of the present invention.

Following the above, the first end "a" of the first switch 131 is switched to its third end "c". The first end "a" of the second switch 132 is switched to its third end "c" so that the capacitor 15 charges the floating capacitor 91 on the contacting point A. The integrating circuit 18 starts to record an absolute value of a current flowing through the resistor 16. The equivalent circuit is shown as FIG. 5.

Figure 6:
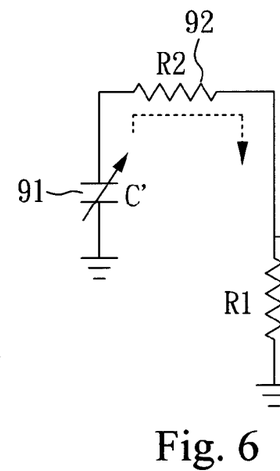
FIG. 6 is a fourth equivalent circuit drawing of the present invention.

After that, the first switch 131 and the second switch 132 act simultaneously. The first end "a" of the first switch 131 is switched to its second end "b". The first end "a" of the second switch 132 is switched to its second end "b" so to discharge the floating capacitor 91 on the contacting point A. The equivalent circuit is shown as FIG. 6. The integrating circuit 18 continues to record the absolute value of a current flowing through the resistor 16. The procedure of charge and discharge to the floating capacitor 91 will proceed many times. During each cycle of charge and discharge, the integrating circuit 18 always records each absolute value of a current flowing through the resistor 16.

Finally, the integrating circuit 18 stops to record the current flowing through the resistor 16. The value of the total current acquired is I. The first end "a" of the second switch 132 is switched to its third end "c". The first end "a" of the third switch 133 is switched to its third end "c". The first end "a" of the fourth switch 134 is switched to its second end "b" so to make the Analogue to Digital converter 17 connect to the capacitor 15 to read the voltage value V2.

The Analogue to Digital converter 17 transmits the first voltage value V1, the second voltage value V2 and the value of current I to a device driver (not shown) to calculate the second resistor value R2 of the conductive resistor 92. It is calculated as:

$$R2 = \frac{1}{2}C\left(\frac{V1^2 - V2^2}{I^2}\right) - R1$$

Figure 7:
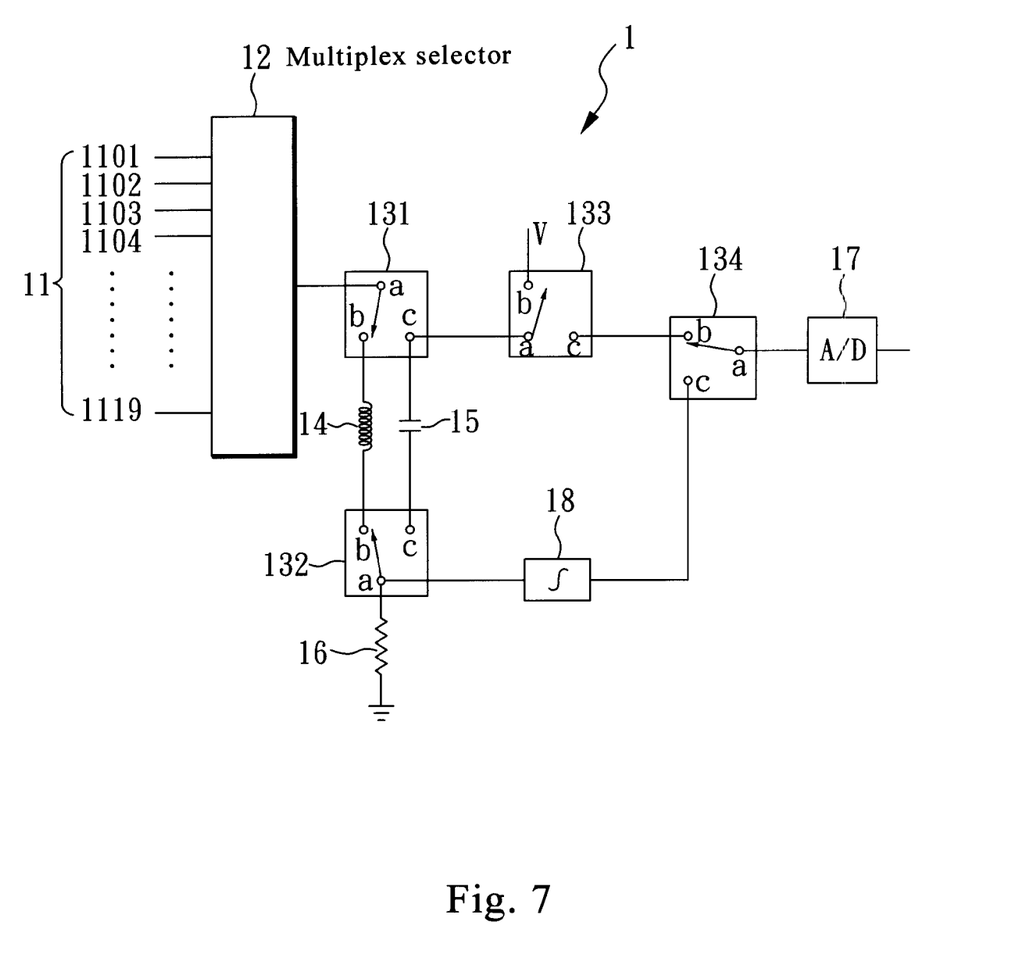
FIG. 7 is a second system structure of the present invention.

The value of R2 can be converted to a coordinate value of the contacting point by the device driver. If I is smaller than a preset value, it means that no finger touches on the touch panel 11. Besides, an inductor 14 can be added between the first switch 131 and the second switch 132 to reduce the happenings of the noise. The inductor 14 is electrically connected to the second end "b" of the first switch 131 and the second end "b" of the second switch 132. The system structure of adding inductor 14 is shown as FIG. 7.

The invention provides another preferred embodiment. Please referring to FIG. 8, the touch panel 11 provided by this invention can be a device with a conductive plane 110 and plural detecting points. For better effect, the plural detecting points are positioned on the four corners of the touch panel 11 as 11a, 11b, 11c and 11d.

Figure 8:
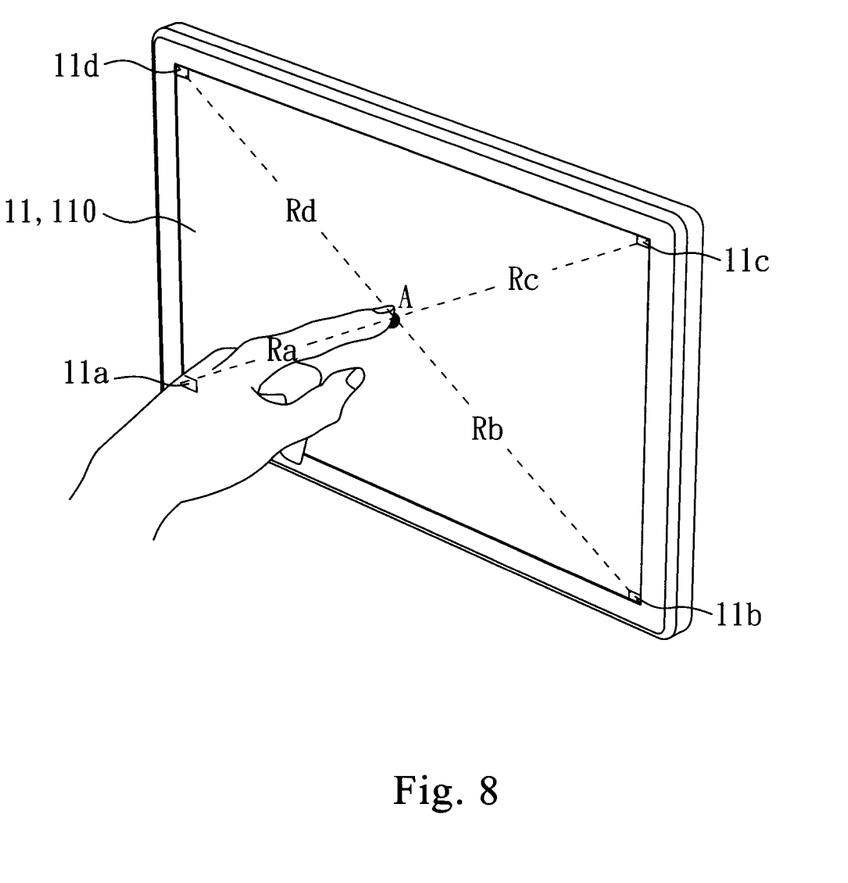
FIG. 8 shows another schematic view of the preferred embodiment example of the present invention.
Figure 9:
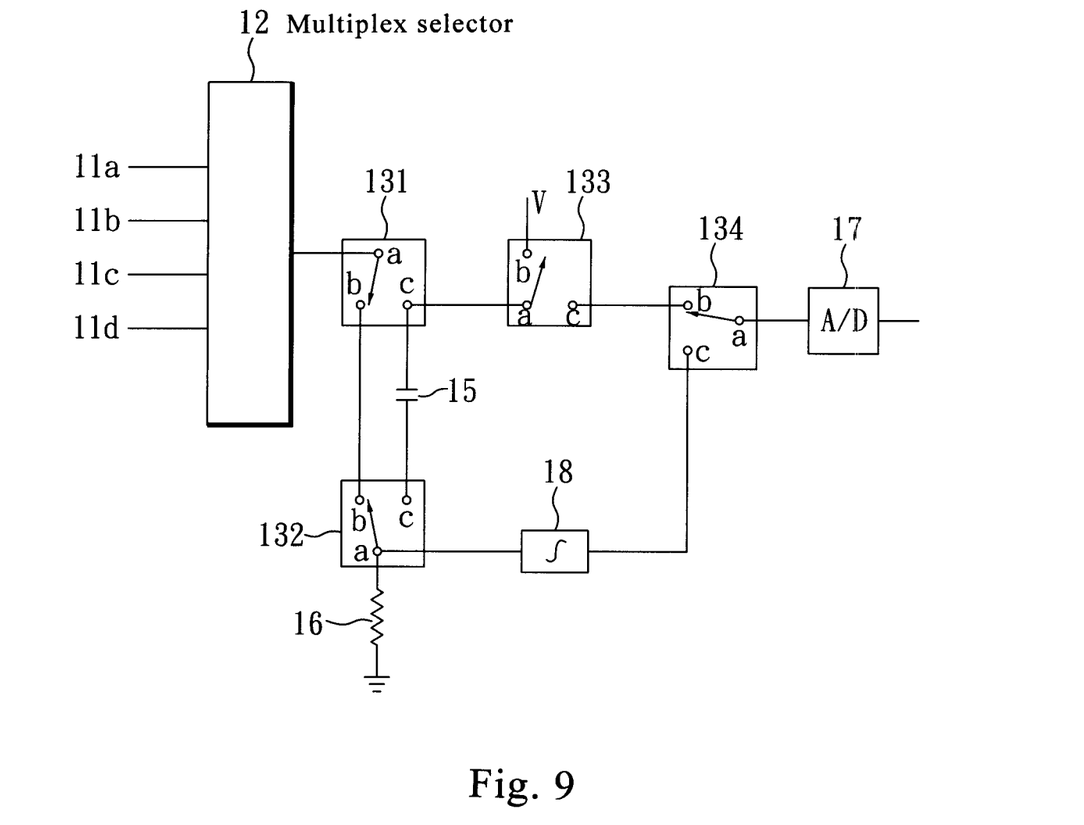
FIG. 9 is a system structure of another preferred embodiment of the present invention.

Following the above, please refer to FIGS. 8 and 9. FIG. 9 shows the system structure of another preferred embodiment of the present invention. The multiplex selector 12 is electrically connected to the four detecting points 11a, 11b, 11c and 11d of the touch panel 11. When the user touches his finger on the contacting point A of the touch panel 11, there is a resistor value Ra between the contacting point A and the detecting point 11a and there is a resistance value Rb between the contacting point A and the detecting point 11b. There is a resistance value Rc between the contacting point A and the detecting point 11c and there is a resistance value Rd between the contacting point A and the detecting point 11d. The calculation of resistance values Ra, Rb, Rc and Rd is stated as above. After obtaining the resistance values Ra, Rb, Rc and Rd, the coordinate value of the contacting point A can also be obtained through conversion of the device driver (not shown).

However, the examples of application described above are only for the convenience of explaining some application examples of the present invention. The scope of patent claimed by the present invention should be based on the content claimed by the present invention not limited to the above application examples.

What is claimed are:

1. A capacitive touch panel device comprising:
   a touch panel having a plural conductive wires;
   a multiplex selector electrically connected to the plural conductive wires of the touch panel;
   a first switch electrically connected to the multiplex selector;
   a first resistor having a first resistor value;
   a second switch electrically connected to the first resistor and the first switch;
   a capacitor having a capacitor value; the capacitor electrically connected to the first switch and the second switch;
   a third switch electrically connected to the capacitor;
   an analog to digital converter;
   a fourth switch electrically connected to the analog to digital converter and the third switch; and
   an integrating circuit electrically connected to the second switch and the fourth switch,
   wherein the third switch is switched to a DC power source and the second switch is switched to the capacitor for charging the capacitor; there is a conductive resistor with a second resistor value existed in the conductive wires between the contacting point of the touch panel and the multiplex selector; the third switch is switched to the fourth switch so to make the analog to digital converter electrically connect to the capacitor to read a first voltage value after the capacitor is charged; the first switch is switched to the capacitor so to make the capacitor charge a floating capacitor which is induced by an object applied to a contacting point on the touch panel; and the integrating circuit records an absolute value of a current flowing through the first resistor.

2. The capacitive touch panel as claimed in claim 1, wherein the first switch is switched to the second switch so to discharge the floating capacitor and the integrating circuit records the absolute a value of the current flowing through the first resistor.

3. The capacitive touch panel as claimed in claim 2, wherein the first switch and second switch again are switched to the capacitor so that the capacitor charge the floating capacitor applied to the contacting point; and the integrating circuit records an absolute value of a current flowing through the first resistor; and the first switch is switched to the second switch again so to discharge the floating capacitor applied to the contacting point and the integrating circuit records the absolute value of a current flowing through the first resistor.

4. The capacitive touch panel as claimed in claim 3, wherein the integrating circuit stops to record the absolute value of a current flowing through the first resistor; and the second switch is switched to the capacitor and the analog to digital converter reads a second voltage value of the capacitor.

5. The capacitive touch panel as claimed in claim 4, wherein the fourth switch is switched to the integrating circuit so to make the analog to digital converter read a total value of current of the equivalent current of the first resistor.

6. The capacitive touch panel as claimed in claim 5, wherein the analog to digital converter transmits the first voltage value, the second voltage value and the value of current to a device driver in order to calculate a second resistor value of such conductive resistor.

7. The capacitive touch panel as claimed in claim 6, wherein the value of the second resistor is calculated as:

$$R2 = \frac{1}{2}C\left(\frac{V1^2 - V2^2}{I^2}\right) - R1$$

wherein C is a value of the capacitor, V1 is a value of the first voltage, V2 is a value of the second voltage, I is a value of the current and R1 is a value of the first resistor value.

8. The capacitive touch panel as claimed in claim 7, wherein the second resistor value is converted into a coordinate value of a contacting point by a device driver, and if I is smaller than a preset value, it means no touching on the touch panel.

9. The capacitive touch panel as claimed in claim 1, wherein there is an inductor electrically connected between the first switch and the second switch.

10. The capacitive touch panel as claimed in claim 1, wherein the multiplex selector is used to scan the plural conductive wires of the touch panel sequentially.

11. A capacitive touch panel comprising:
a touch panel having a conductive plane and plural detecting points;
a multiplex selector electrically connected to the plural detecting points of the touch panel;
a first switch electrically connected to the above multiplex selector;
a first resistor having a first resistance value;
a second switch electrically connected to the first resistor and the first switch;
a capacitor having a capacitance value, the capacitor electrically connected to the above first switch and the second switch;
a third switch electrically connected to the capacitor;
an analog to digital converter;
a fourth switch electrically connected to the analog to digital converter and the third switch; and
an integrating circuit electrically connected to the second switch and the fourth switch,
wherein the third switch is switched to a DC power source and the switch is switched to such capacitor for charging such capacitor; the touching point and the conductive plane of plural detecting points, there is a conductive resistor existed individually between each detecting point and the touching point; there the conductive resistors have an individual resistance value; the third switch is switched to the fourth switch so to make the analog to digital converter electrically connect to the capacitor to read a first voltage value after the capacitor is charged; the first switch is switched to the capacitor so to make the capacitor charge a floating capacitor applied to a contacting point on the touch panel; and the integrating circuit records an absolute value of a current flowing through the first resistor.

12. The capacitive touch panel as claimed in claim 11, wherein the first switch is switched to the second switch so to discharge the floating capacitor; and the integrating circuit records the absolute value of a current flowing through the first resistor.

13. The capacitive touch panel as claimed in claim 12, wherein the first switch and the second switch again are switched to the capacitor so to make the capacitor charge the floating capacitor applied to the contacting point; and the integrating circuit records an absolute value of a current flowing through the first resistor; and again the first switch is switched to the second switch so to discharge the floating capacitor and the integrating circuit records the absolute value of a current flowing through the first resistor.

14. The capacitive touch panel as claimed in claim 13, wherein the integrating circuit stops to record such value of the current flowing through the first resistor; and the second switch is switched to the capacitor; the analog to digital converter reads a second voltage value of the capacitor.

15. The capacitive touch panel as claimed in claim 14, wherein the fourth switch is switched to the integrating circuit so to make the analog to digital converter read a total value of current of the equivalent current of the first resistor.

16. The capacitive touch panel as claimed in claim 15, wherein the analog to digital converter transmits the first voltage value, the second voltage value, and the current value to a device driver to calculate a second resistor value of such conductive resistor.

17. The capacitive touch panel as claimed in claim 16, wherein the value of the second resistor is calculated as:

$$R2 = \frac{1}{2}C\left(\frac{V1^2 - V2^2}{I^2}\right) - R1$$

wherein C is the value of the capacitor, V1 is the value of the first voltage, V2 is the value of the second voltage, I is the value of the current and R1 is the value of the first resistance value.

18. The capacitive touch panel as claimed in claim 17, wherein the second resistor value is converted into a coordinate value of a contacting point by a device driver, and if I is smaller than a preset value, it means that no touching is on the touch panel.

* * * * *